US008032448B2

(12) United States Patent
Anderson et al.

(10) Patent No.: US 8,032,448 B2
(45) Date of Patent: Oct. 4, 2011

(54) DETECTING AND MEASURING RISK WITH PREDICTIVE MODELS USING CONTENT MINING

(75) Inventors: Russell Anderson, Oceanside, CA (US); Larry S. Peranich, San Diego, CA (US); Ricardo M. Dungca, San Diego, CA (US); Joseph P. Milana, San Diego, CA (US); Xuhui Shao, San Diego, CA (US); Paul C. Dulany, San Diego, CA (US); Khosrow M. Hassibi, San Diego, CA (US); James C. Baker, Encinitas, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 737 days.

(21) Appl. No.: 11/867,602

(22) Filed: Oct. 4, 2007

(65) Prior Publication Data

US 2009/0234683 A1    Sep. 17, 2009

Related U.S. Application Data

(63) Continuation of application No. 09/675,412, filed on Sep. 29, 2000, now Pat. No. 7,376,618.

(51) Int. Cl.
*G06Q 40/00* (2006.01)
(52) U.S. Cl. ........................................... 705/38
(58) Field of Classification Search .................. 705/38
See application file for complete search history.

(56) References Cited

U.S. PATENT DOCUMENTS

| 5,317,507 | A | | 5/1994 | Gallant |
| 6,018,723 | A | | 1/2000 | Siegel et al. |
| 6,026,397 | A | * | 2/2000 | Sheppard .............................. 1/1 |
| 6,073,112 | A | | 6/2000 | Geerlings |
| 6,134,532 | A | | 10/2000 | Lazarus et al. |
| 6,189,005 | B1 | | 2/2001 | Chakrabarti et al. |
| 6,430,539 | B1 | | 8/2002 | Lazarus et al. |
| 6,505,168 | B1 | * | 1/2003 | Rothman et al. |

(Continued)

FOREIGN PATENT DOCUMENTS

WO    WO0113295    2/2001

OTHER PUBLICATIONS

Business Wire 1998, "Aptex Software Announces SelectResponse 3.0 for Personalized Customer Interaction and Response"; p. 0408, Nov. 2, 1998, San Diego.*

(Continued)

*Primary Examiner* — Alexander Kalinowski
*Assistant Examiner* — Edward Chang
(74) *Attorney, Agent, or Firm* — Mintz, Levin, Cohn, Ferris, Glovsky and Popeo, P.C.

(57) ABSTRACT

Computer implemented methods and systems of processing transactions to determine the risk of transaction convert high categorical information, such as text data, to low categorical information, such as category or cluster IDs. The text data may be merchant names or other textual content of the transactions, or data related to a consumer, or any other type of entity which engages in the transaction. Content mining techniques are used to provide the conversion from high to low categorical information. In operation, the resulting low categorical information is input, along with other data, into a statistical model. The statistical model provides an output of the level of risk in the transaction. Methods of converting high categorical information to low categorical clusters, of using such information, and other aspects of the use of such clusters are disclosed.

28 Claims, 4 Drawing Sheets

U.S. PATENT DOCUMENTS

| | | | |
|---|---|---|---|
| 5,325,298 A | | 6/1994 | Gallant |
| 5,619,709 A | | 4/1997 | Caid et al. |
| 5,649,114 A | | 7/1997 | Deaton et al. |
| 5,819,226 A | * | 10/1998 | Gopinathan et al. ............ 705/44 |
| 5,878,419 A | | 3/1999 | Carter |
| 5,940,822 A | | 8/1999 | Haderfe et al. |
| 6,006,223 A | | 12/1999 | Agrawal et al. |

OTHER PUBLICATIONS

Mutch, John, "High tech has big impact on claim handling", v103n20, pp. 20-21+, May 17, 1999, ISSN: 1042-6841. Journal Code: NUN.*

Johnson, Colin R. "Web Engines Get a Brain", Electronic Engineering Times, p. 20, Feb. 25, 1998, ISSN: 0192-1541.*

U.S. Appl. No. 10/638,648, filed Aug. 12, 2003, Anderson, et al.*

Salton, G. et al.; A Vector Space Model for Automatic Indexing; Communications of the ACM, vol. 18, No. 11, Nov. 1975.

Sutcliffe, Richard; Distributed representations in a Text Based Information retrieval System: a New Way of Using the vector Space Model; Dept. of Computer Science; 1991.

Wong, S. et al.; On Modeling of information retrieval Concepts in Vector Spaces; University of Regina; 1987; ACM.

* cited by examiner

DETECTING AND MEASURING RISK WITH PREDICTIVE MODELS USING CONTENT MINING

CROSS REFERENCE TO RELATED APPLICATIONS

This application is a Continuation of U.S. patent application Ser. No. 09/675,412 filed 29 Sep. 2000, now U.S. Pat. No. 7,376,618 all of which is incorporated herein in its entirety by this reference thereto.

FIELD OF INVENTION

This application is generally related to risk detection and measurement in transactions and accounts, and more specifically to risk detection and measurement by applying statistical predictive models to the high categorical content of transactions.

BACKGROUND OF THE INVENTION

Credit cards are one of the predominant forms of payment for transactions, in both the retail and online environments. As such, credit card fraud (or more generally, financial card fraud, including credit card fraud, and fraud on financial instruments of general similarity to credit cards, such as debit cards, retail cards, and even checks) is a major source of risk and loss to both card issuers and merchants. This problem has existed ever since credit cards became a significant method of payment, but has become very substantial and well-appreciated problem in the past 10 years.

Various solutions have been applied to the problem with the most successful solutions being those based on statistical models developed from the transactional pattern of legitimate and fraudulent use of credit cards. The HNC Falcon solution is an example of this approach (see e.g., U.S. Pat. No. 5,819,226). Traditionally, only information that can be gleaned from the numerical and low-categorical information of the transaction stream (information such as transaction amount, location, industry-code of the merchant, time and date, etc.), has been usable by statistical methods.

The textual information available in credit card transactions is typically a character string describing the merchant (commonly appearing in a standard monthly billing statement). Typical text descriptors contain the merchant name, store number, city, state, and ZIP code. The latter three fields are redundant, since these data are also coded in geographical and postal data fields. However, the merchant name offers unique information. This type of textual information has not been previously used in statistical models due to the extremely high dimensionality of text data and the consequent difficulty of transforming textual data into useful predictors of fraud. However, human fraud control experts recognize this information as being highly valuable.

In some instances, existing systems have used other categorical fields to identify and classify merchants, such as the merchant SIC code (Standard Industry Code), the merchant ID number, or the Point of Sale (POS) terminal ID. However, the use of merchant ID codes is problematic for different reasons. First, merchant ID codes are not always reliable or unique (although, arguably, HNC could require clients to provide standardized merchant ID numbers in both consortium data contributions and in the API data feed). Furthermore, there is little or no consistency in how merchant ID numbers are issued. Several large merchants use a single ID number, while others use a separate ID number for each franchise, department, or POS device. To illustrate the magnitude of this problem, in one sample of 47 million transactions, there were found nearly 3 million unique merchant ID numbers—an average of only 15 transactions per merchant ID number. This clearly indicates that a portion of these merchant ID numbers should be the same or related to each other.

Standard Industry Codes are equally unreliable by themselves. SICs classify merchants into general (and often arbitrary) categories. In some cases, industry codes are highly specific. For example, most major car rental companies and hotels/motels have uniquely assigned SIC codes (e.g. Avis=3389 or Budget=3366, Sheraton hotels=3503 or Motel 6=3700). For the most part, however, SIC codes have very poor resolution. Large fractions of all transactions are classified into overly broad categories, such as "department stores" (SIC=5311) or "grocery stores" (SIC=5411). Casual inspection of the merchant text associated with these transactions reveals that potentially valuable information is being ignored. For one obvious example, the merchant text could readily allow discrimination between "budget" and "high-scale" department stores.

In some countries like Japan, POS Terminal ID's are unique and follow a particular format from which each merchant can be uniquely identified. In addition, each POS device used by the merchant can also be uniquely identified. However, in most other countries, POS Terminal ID's are not unique and do not follow any standard format.

Variables built using low-volume merchants also tend to be statistically unreliable. If one were to attempt using merchant ID risk tables (providing a transaction risk factor for each merchant ID), the safest course would be to replace the individual merchant risk with the SIC risk associated with this merchant category. Under this scheme, valuable information would be lost for merchants with multiple ID numbers, when low-volume ID numbers would default to SIC code, rather than the parent merchant. Obviously, it would be preferable for all Macy's stores to map to a single code (or to a subcategory "high-end department store"), rather than defaulting to a generic SIC code (in this case SIC=5311; "department stores").

This inadequacy of statistical methods has often been addressed by a human review stage that is consequent to the statistical filtering provided by a statistical model. Once an account has been statistically flagged as potentially containing fraudulent activities, a human analyst then reviews the accounts before taking fraud-control actions. The human analyst, unlike the statistical model, has the ability to understand textual data and incorporate it's significance into the overall analysis Unfortunately, the human review process, in addition to the inefficiencies and inconsistencies associated with a non-automated stage, tends to degrade the quality of fraud identification more than help it. Human analysts, by necessity, have a significantly less assembled fraud experience than a computerized method can compile (e.g. at most thousands of cases, as compared with hundreds of millions by a statistical model). Consequently, the overall ability of human analysts to distinguish fraudulent transactions from non-fraud ones, given the same information, has consistently been demonstrated to be inferior to that of high-end computer-trained statistical models that were built using vast quantities of historical data. Even the advantage of access to textual information that is available to human analysts but not traditional statistical methods, is not enough to compensate for the loss of performance experienced when human analysts are allowed to "second-guess" computer-derived statistical fraud classification. Consequently, the current "best practices" process for fraud detection, under most circumstances, is not to allow human judgment to over-rule the computerized analysis.

Accordingly, it is desirable to provide a statistical method of risk measurement and detection, such as may be used for financial card fraud prevention that uses textual or other high categorical information to assist in the detection and measurement of transaction or account risk.

SUMMARY OF INVENTION

The present invention uses statistical content mining methods of text analysis to access textual and high-categorical information in credit card transactions, authorizations, postings, and related data files/transmission for the purpose of better statistical fraud control. The solution is preferably implemented through the application of the computation methodologies that reduce the dimensionality of the textual or high categorical information to lower dimensionality data, useful for input to a classification system.

One preferred embodiment content mining approach uses context vector (CV) technology to reduce the high-dimensional categorical text data found in credit (or other similar financial) card transactions into low-dimensional numerical or categorical variables. These variables may then be input into a detection system for measuring and detecting risk in these transactions. In one embodiment, the CV methodology collects large quantities of historical data from credit card related data files with text or high-categorical data (e.g., postings, authorizations, etc.) and examines statistically clusters of co-occurrences (i.e., words that typically appear together in text, such as merchants that typically service the same customers, etc. and whose names appear in the same credit card statement). These clusters indicate affinities of categorical members. Each word, merchant name or other category is assigned a vector, in a high-dimensional space, that—through its proximity to the vectors assigned to other categories— identifies its affinities. In other words, merchants that typically service the same class of clientele (for instance, high-end shops) would receive vectors that are close to each other in the high-dimensional space. These vectors, or identified clusters of vectors, then provide a bridge from the statistically intractable high-categorical data forms to a continuous, mathematically treatable CV form. The CV vectors (or their clusters) are utilized by the statistical methods in training risk/fraud detection models; these models are used in a live environment to detect risk in transactions, preferably as the transactions are being processed.

In the context of the present invention, the text data used for analyzing co-occurrence may be one or more of: transaction data, cardholder master file data, cardholder demographic data, customer service data, web page data from customer interactions, or merchant feed data.

Accordingly, one aspect of the invention is a credit card fraud detection system, method, computer program product that uses the statistical co-occurrence properties of merchant names in cardholder credit data files to identify clusters of merchants and clusters of consumers in a same vector space, and that when scoring a transaction of a consumer with a merchant, uses a measure of the consumer's distance from the merchant (or the merchant's cluster) as an input to the predictive model. This aspect of the invention further includes the development of such a predictive model.

Another aspect of the invention includes creating a number of merchant clusters from the co-occurrence information of merchant identifiers (e.g. merchant names) in cardholder credit data files. Each merchant cluster has an identifier (e.g. a numbered ID). For each cardholder, create a vector of their affinity to each merchant cluster. The affinity measure may be based on various metrics, such as the number of times each consumer transacts at a merchant member of each merchant cluster, or the cardholder's total dollar volume in each merchant cluster, or other measures of cardholder activity in the clusters. Where cardholder clusters are used, a measure of the cardholder cluster activity in the merchant cluster may be used instead. A transaction between a consumer and a merchant is received online, and provided to predictive model for scoring, along with a variable representative of the affinity of the cardholder in the transaction to the merchant cluster of the merchant in the transaction. The predictive model scores the transaction using this variable. The score is used for decisioning on whether the transaction is fraudulent, for example, or more generally on whether the transaction is approved, declined or otherwise labeled.

Another aspect of the invention includes a process similar to that just described, but instead of creating an affinity vector for each cardholder, first a number of cardholder clusters are created, by clustering the cardholder vectors. Each cardholder is labeled with the cardholder cluster, and the affinity vector for that cardholder cluster relative to the merchant cluster of the merchant of the transaction is used as the input to the predictive model. This approach takes less computational resources since each cardholder is assigned one of a limited number of cardholder cluster vectors. The cardholder vectors are derived from the co-occurrence statistics of merchant names in the credit data files, such that cardholders who frequent a similar group of merchants form a cluster.

Another aspect of the invention is the use of the statistical co-occurrence of merchant names in credit data files to identify merchant clusters in a data-driven method, which may be distinct from and more richly detailed than the a priori assigned SIC code groupings conventionally used. Another aspect of the invention is the creation of merchant cluster names from words or terms descriptive of the merchant types or names of the merchants in a cluster. An example of this is the selection of the two most frequently occurring merchant names in a cluster which have different SIC codes.

Another aspect of the invention is the use of the statistical co-occurrence of merchant names to identify clusters of cardholders (as distinct from merchant clusters) in a data-driven manner. Another aspect of the invention is the creation of cardholder cluster names from the words or terms descriptive of merchants or lifestyle information related to each cluster.

Another aspect of the invention is the calculation of the risk of each merchant cluster. The risk of a merchant cluster is the percentage of transactions taking place at merchant members of the cluster that eventually are determined to have been fraudulent. When scoring a transaction between consumer and merchant, the detection system is provided with a variable representative of the risk of the merchant's merchant cluster in the transaction.

Another aspect of the invention is the calculation the risk of each possible pair of cardholder cluster and merchant cluster. The risk of a pair of cardholder and merchant clusters is the percentage of transactions taking place at merchant members of the merchant cluster by cardholder members of the cardholder cluster that eventually are determined to have been fraudulent. When scoring a transaction, the detection system is provided with a variable representative of the risk of the cardholder and merchant clusters in the transaction.

Another aspect of the invention is calculating, for each merchant cluster, parameters representative of a merchant cluster (such as average transaction amount, average transaction volume, etc.). When scoring a transaction, the detection system is provided with variables representative of one or more of these parameters for the merchant cluster in the transaction.

Another aspect of the invention is calculating, for each cardholder cluster, parameters representative of a cardholder cluster (such as average transaction amount, average transaction volume, etc.). When scoring a transaction, the detection system is provided with variables representative of one or more of these parameters for the cardholder cluster in the transaction.

Another aspect of the invention is the use the merchant cluster as a substitute (or an addition) to the SIC code in all instances and manners the SIC code is used in the detection system. Typically the SIC code (or a portion thereof) is used in a detection system or predictive model as an input for predicting whether the transaction is fraudulent. This aspect of the present invention uses a merchant cluster vector (or identifier) directly as a substitute for (or as another input to) the SIC code when scoring a transaction.

An advantage over previous methods stems from the accessibility of high-categorical data to a machine-trained statistical model.

The invention also incorporates the various software products and computer implemented processes for developing, modeling, and deploying in a runtime environment the fraud detection predictive model using content mining approaches. Further the invention also includes the decision systems that use the results of such a predictive model to decision on authorizations, transactions and the like. The invention further includes the workflows developed or implemented for processing such transactions. The invention further includes computer program products that support the implementation, execution or development of the methods or systems, and computer transmissible signals or medium.

The invention further extends between fraud detection in credit card transactions to include fraud detection in non-credit card environment, such as debit cards, telephone calling cards, and any other credit relationship (e.g. credit cards, loans, mortgages, leases, life insurance) including both at the application phase (i.e. application fraud) and during transaction or claims processing. The invention further extends beyond fraud detection in these and related environments to measurement of risk in general, e.g. measures of the risk of an application, transaction, or a claim submitted for processing. The invention also includes the integration of content mining techniques with other types of predictive models, for example, models of health care fraud (e.g. in claims processing), benefits processing (e.g. workers' compensation insurance), application fraud (insurance premiums and/or claims).

The invention may be utilized in these many environments to identify fraud, risk, abuse, etc. by any entity that may be modeled from the data, including but not limited to consumers (individuals, groups, households, etc.), merchants (individual stores, all stores of a given company, etc.) facilities (e.g. service providers, claims processors), employees (of merchants, processors, etc.), providers (e.g. healthcare providers such as doctors, practices, hospitals, labs), and intermediary third parties that directly or indirectly handle applications, claims, or transactional data.

The features and advantages described in this summary and the following detailed description are not all-inclusive, and particularly, many additional features and advantages will be apparent to one of ordinary skill in the art. Moreover, it should be noted that the language used in this disclosure has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Data Dimensionality Reduction in Risk Detection System

Figure 1:
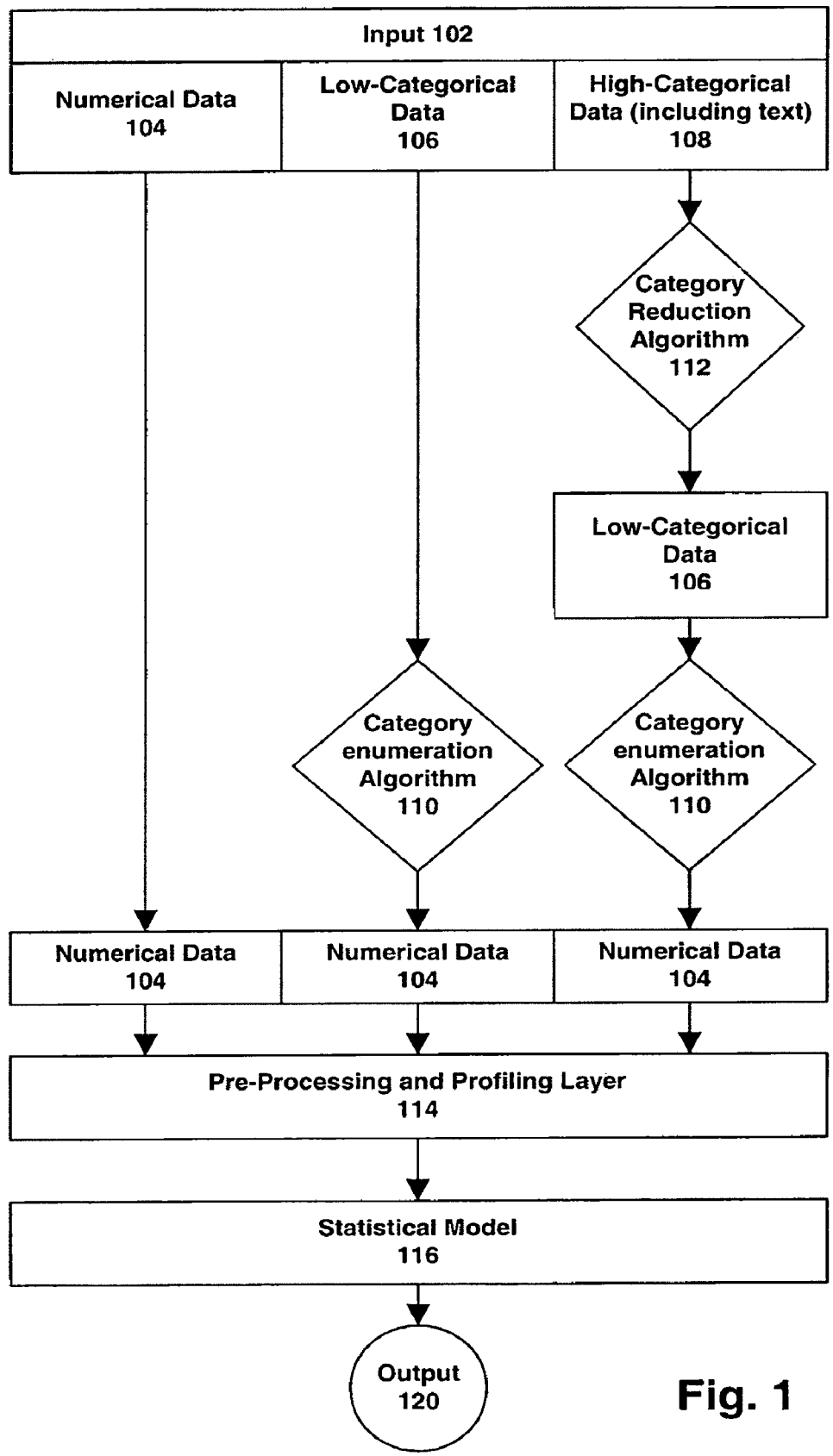
FIG. 1 is an illustration of the operation of one embodiment a risk detection system 100.
Figure 4:
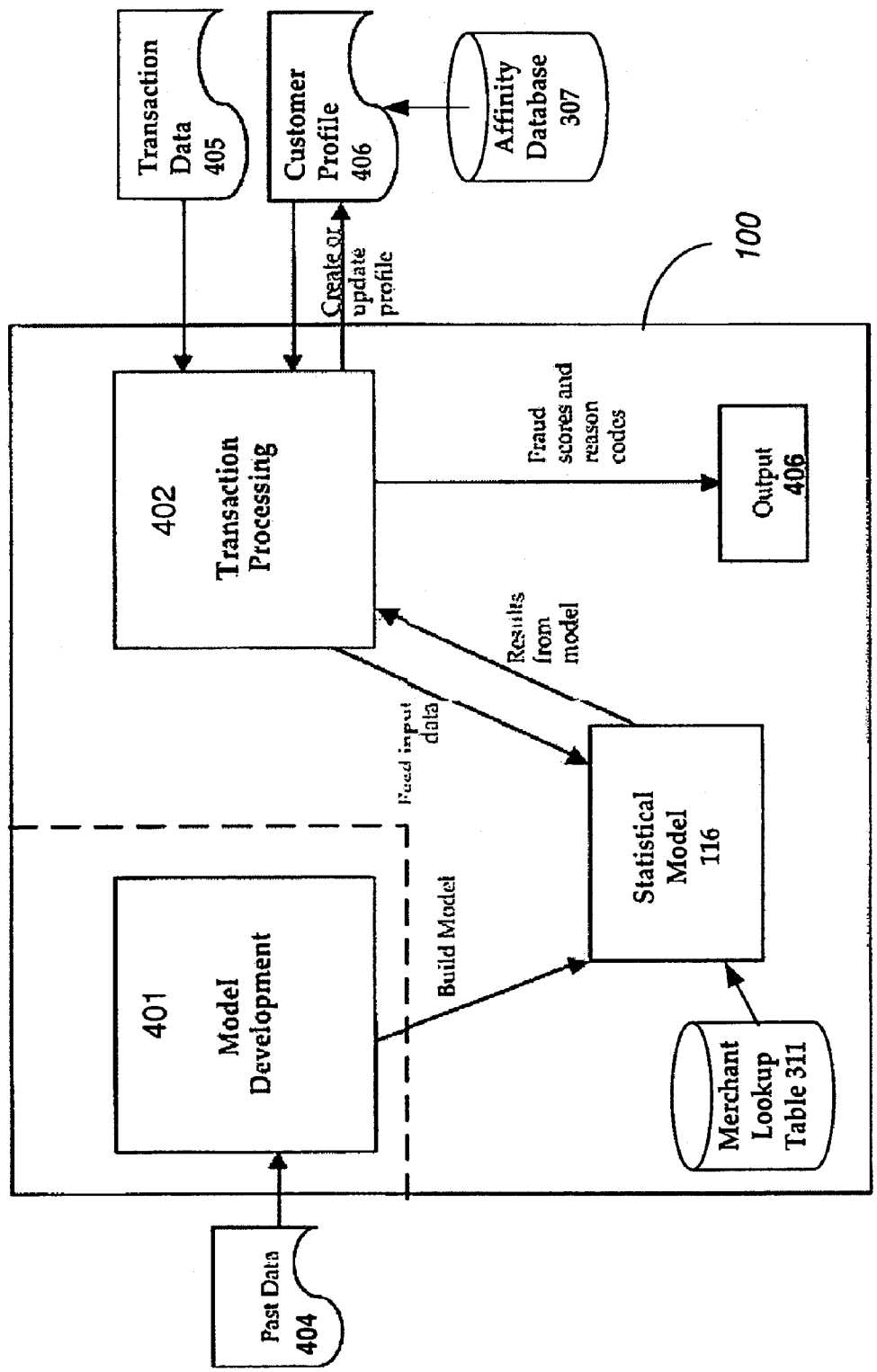
FIG. 4 is an illustration of one embodiment of a risk detection system 100.

FIG. 1 summarizes where the operation of one embodiment present invention in the context of a risk detection system 100 (which is not illustrated in FIG. 1); one such a system is illustrated in FIG. 4, and described further below.

The Statistical Model 116 scores individual transactions. Credit card transactions are exemplary transactions, but other types of transactions may be scored, such as applications for credit, Internet transactions, payments, checks, debits, etc. Each transaction has data fields associated with it. The information contained within those data field (as well as information gleaned from the data fields of prior transactions) is used to compute—using a statistically derived value—the score of the transaction. The content of these data fields may be understood as being provided in one of three levels, or types, of representation: Numerical 104, Low Categorical 106, and High Categorical 108.

Numerical data fields 104 are supplied in number form (e.g. transaction amount, line of credit, etc.) or a form that is directly translatable to a number form (e.g. date-time stamp). The values supplied in numerical data fields may be used directly in mathematical equations.

Low-Categorical data fields 106 are supplied in the form of a code that can have a small number of potential values. An example of Low-Categorical data field is the Keyed/Swiped indicator (telling whether the transaction authorization stemmed from the card being swiped through a magnetic reader or from the account number having been keyed in directly by the merchant) where there are two potential values ("keyed" and "swiped"). Another example is the Mail-Order-telephone-Order (MOTO) indicator, and so on. Even if a field is represented by a numerical code (e.g. a code number from 1 to 10), it is still considered a low-categorical field since the code is not representative of the numerical value or used for its numerical value in a mathematical equation. For example, the Merchant Category Code (MCC, a system of classifying merchant types based on the Standard Industry Code [SIC] system) is represented by a 4-digits code, yet it is considered to be a categorical—not a numerical—data field type.

There are many methods, well known in the art, of converting low-categorical information to numerical information that can be used in mathematical equations. One commonly used method is to assign a new variable for each possible value that may be taken by the low-categorical data field, and to set that variable to 1 or 0 based on whether that value is actually taken.

High-Categorical data fields 108 are supplied in a form that can take a very large number of potential values. A field with free text information can be considered a high-categorical data field. Likewise, the name of a merchant involved in the transaction is of high categorical value, in light of the generally unlimited number of different merchant names.

One aspect of the present invention is a methodology of converting high-categorical data to-low-categorical data for use in a detection model that detects or measure risk.

The overall system flow depicted in FIG. 1 begins with Input 102 (transaction data) that potentially contains all three data field representation forms. The Numerical Data 104 is directly usable by the mathematical formulas. The Low-Categorical data fields 106 are converted to Numerical Data 104 using one of the many well-known enumeration algorithms 110. The High-Categorical data fields 108 are converted by a Category Reduction Algorithm 112 to Low-Categorical representation 106 and subsequently converted by an enumeration algorithm 110 to Numerical Data 104. The post-conversion, all-numeric data is supplied to a Pre-Processing and Profiling Layer 114 that may maintain historical profiles of the individuals identified in the transaction (e.g. profiles of the account holders), and perform various other calculations before forwarding the pre-processed data to the ultimate Statistical Model 116. The Statistical Model 116 scores the transaction(s), providing a transaction score indicative of the level of risk in the transaction (e.g., a score indicative of the likelihood of fraud).

Referring to FIG. 4, there, is shown an illustration on one embodiment of the overall functional architecture of a risk detection system 100. System 100 is broken down into two major components: model development component 401 and transaction processing component 402. Model development component 401 uses past data 404 to build the Statistical Model 116 containing information representing learned relationships among a number of variables germane to risk factors of the types of transactions being processed. Together, the learned relationships form a model of the behavior of these variables. The model development component 401 makes use of the Category Reduction Algorithm 112 and the enumeration algorithms 110 to prepare the past data 404 for use in training the Statistical Model 116. Although a neural network is used in the preferred embodiment of the Statistical Model 116, any type of predictive modeling technique may be used.

Transaction processing component 402 performs three functions: 1) it determines the likelihood of fraud (or more generally, the degree of risk) for each transaction by feeding data from various sources (transaction data 405, cardholder profile 406) into Statistical Model 116, obtaining results, and out-putting them 407; 2) when applicable, it creates a record in a profile database 406 summarizing past transactional patterns of the entity providing the transaction (e.g. a cardholder); and 3) when applicable, it updates the appropriate record in profile database 406. In the first function, the transaction processing component 402 uses the enumeration algorithms 110 and the Category Reduction Algorithms 112 as necessary to prepare the data into the same form as used in training the Statistical Model 116. In the last function, the transaction processing component 402 further provides the functionality of the pre-processing and profiling layer 114 of FIG. 1. Though model development component 401 and transaction processing component 402 are illustrated as being part of the same system, in some embodiment they can operate on entire separate and unrelated computer systems, with the Statistical Model 116 developed by the model development component 401 being transferred to the transaction processing component as needed. The affinity database 307 and merchant lookup table 311 are further described below with respect to FIGS. 3 and 2 respectively.

The risk detection system 100 operates on general purpose computing systems, having high performance processors, memory, storage, and network connectivity. Suitable computer systems are manufactured by Sun Microsystems, Inc. of Mountain View, Calif. The model development and transaction processing components may be obtained from HNC Software, Inc. of San Diego, Calif., sold under the FALCON trademark.

In the context of the present invention, the transaction data includes merchant names, which are High Categorical data 108. These merchants names are converted to Numerical Data 104 so as to be available to the Statistical Model 116 in generating a transaction score 120. The next section describes how merchant names are so converted. While we restrict our discussion to merchant clustering, the methodology applies to any text-based or other high-categorical form of information.

Merchant Clustering

The preferred technology for clustering merchants is a content mining, and most preferably here is the method disclosed in the CV patent, referenced above. The description of the CV methodology provided here is intended for clarity purposes only, reference to the incorporated documents to be had in conjunction with this description.

Generally and by way of summary, one embodiment of the CV methodology accepts a large quantity of plain-language textual documents (the "corpus"). After a certain level of preprocessing (removing low-content words such as "the", reducing complex words to their base stem such as "flying" to "fly", etc.), a list of all unique words is compiled. A two-dimensional array of all possible pairs of unique words is created. The array is called a "co-occurrence matrix." The entries in that array represent the frequency of occurrence, within the document corpus, of each pair of words in close proximity to each other. (So, for instance, the pair "fly" and "airplane" may have more occurrences of the two words appearing closer together in text documents than the pair "fly" and "village"). Additional processing is done on the co-occurrence matrix to compensate for various factors (such as the relative rareness of various words).

The CV process then assigns each word a high dimensional vector with the property that the higher the co-occurrence value of two words, the closer (in Euclidean distance) the vectors representing the two words are to each other. Subsequent to the assignment of the high-dimensional vector, words may be clustered together using any of the many well known clustering algorithms based on their respective vectors.

An important property of the CV methodology is that related words are mapped into a compact section of the high-dimensional vector space and would thus cluster together. The words "airplane" and "kite" might not appear together very often, but they both may have high co-occurrence with various other words ("fly", "glide", "high", "air", "climb", etc.) and will thus have vectors that are close to each other (and perhaps share a cluster).

In the present invention, the affinity between cardholders and merchants can be treated in a likewise manner, where affinity can be expressed by the relative orientation of a cardholder context vectors with merchant vectors. This information, and other derivative information, is input into the Statistical Model 116 to provide an improved transaction score.

Figure 2:
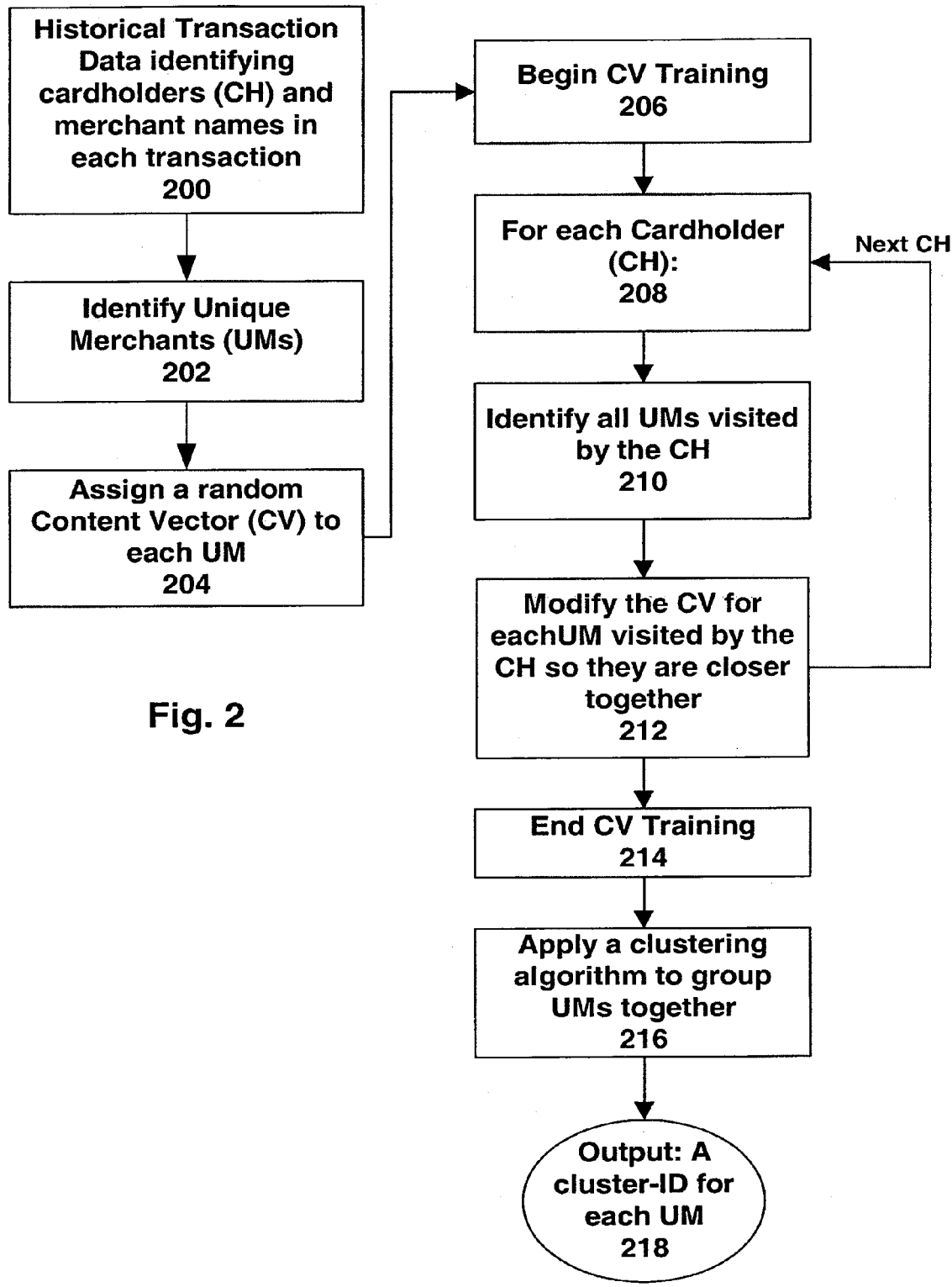
FIG. 2 is an illustration of one embodiment of a process of building merchant clusters.

This process of applying the CV methodology is described in the context of handling credit card transaction data from credit cardholders. FIG. 2 outlines the process by which content vectors for merchants are built and used to form Merchant Clusters. This process is engaged in the Category Reduction Algorithm 112.

Referring now to FIG. 2, the process of building merchant clusters will be described first generally, and then in more detail. The process begins with large quantity of Historical Transaction Data 200 containing the identification of the individual cardholders and named merchants that participated in each transaction. Such files are common in the credit card industry and are often referred to as authorization, transaction, and/or settlement files (in reference to various stages of the credit card transaction events). This file serves as the analog of the corpus described in the CV methodology.

Given the data, the next step is to identify 202 Unique Merchants (UMs) based on merchant name field and other information in the transaction data. Some pre-processing may be required, depending on the cleanliness level of the original file. (Operational credit card transaction systems sometimes contaminate the merchant-name field with other information—for example concatenating the name of a travel agency with the airline ticket number). The list of merchants serves as the analog of the list of words described in the CV methodology.

Next, each UM is assigned 204 a random high dimensional (typically, about 300 dimensions) unit vector (a unit vector is one where the magnitude of the vector is set to 1). That vector is referred to as the Content Vector (CV) of the UM. The assignment of a random vector is one way of establishing an initial condition where the content vectors are all substantially orthogonal to each other. This helps ensure an initial condition where no two merchants are assumed related to each; the relationship of merchants is thus empirically determined based on the proximal co-occurrences of the merchant names.

The CV Training Process then commences 206: For the first cardholder (CH), identify 210 all unique merchants (UMs) with whom the cardholder has transacted in the historical data. Those merchants are said to all have co-occurrence with respect to each other. (In alternative embodiment, the co-occurrence definition may require that the transactions at the merchants occur with some predetermined amount of time, say within a 1 week, 3 week, or 3 month window). Next, modify 212 the CV's of all the merchants visited by the first cardholder so as to bring them closer together (in the Euclidean distance measure) to each other. This process is repeated with the second cardholder, and so on. Various specific algorithms and learning laws pertaining to the initial assignment conditions of the CVs and the learning laws to modify the CVs are disclosed in more detail in the CV patent, cross-referenced above.

Upon conclusion of the CV training process 208, there will be a CV vector associated with each UM. As a result of the CV training process, the CVs of the UMs have the feature that UMs (or more generally merchants) that frequently co-occur in the transactions have CV with similar orientations in the vector space.

Next, a standard (known in the arts) clustering algorithm is applied (such as PROC CLUS in SAS) to identify 216 clusters of merchants with CVs are close to each other.

For each merchant name (UM), there can then be output a Cluster ID identifying the merchant cluster to which the merchant belongs. The merchant cluster Ids are Low Categorical data because they are relatively limited in number (e.g. typically 50 to 400) relative to the number of unique merchant names (typically in the millions). The relationship between each UM and a cluster ID is captured in the merchant lookup table 311. This lookup table 311 may also include a mapping of merchant ID to the corresponding UM.

We now describe in more detail various implementations of the foregoing steps.

Obtaining Historical Transaction Data

It is desirable to have data sets of transactions from between 5-6 million accounts. It is also desirable to use data from at least 12 months of transactions. Also, since merchant clustering based on co-occurrences of merchant names, there is a natural tendency for clusters to become dominated by local geography (since cardholders tend to shop at stores which are near each other). Therefore, in order to guarantee the most general results, the data set should be taken from a source with the broadest market footprint as possible.

It is most desirable for the Historical Data to be processed into a standardized format. Once the account and transaction data is converted into this format it is easily accessible and manipulated. The general format is to put all of the transactions for a specific account on one line, with the account information at the beginning of the line followed by transaction fields. The account fields may include:

| | |
|---|---|
| AccountId | account identifier (e.g. account number) |
| PopId | Account Type (e.g., normal, gold, platinum) |
| behr_scr | (credit bureau) Behavior score |
| statcode | state code (2-letter code) |
| open_dt | Account open date |
| open_buy | Account open to buy (avail credit) |
| cred_lmt | Account credit limit |
| birthdt | birthdate |
| all_out | total number of plastics outstanding |
| tot_fin | total financial charges |
| bkrt_scr | (credit bureau) bankruptcy score |
| TxnList | List of transactions |

The transaction field may include:
Transaction code
Transaction amount (in cents)
Transaction date
Transaction SIC code
Merchant Name
A sample transaction line is as follows:

4121380000130400,1,189744413,19890317,1,8700,12,681,8653.87,S,1,
314,4,80000,19970103,06010,corestates-
br,17,70000,19970111,06010,unknown-
merchant,2,2425,19970121,05969,ticketmaster-wash-
balt,2,1604,19970128,05531,pepboys,17,26000,19970208,06010,unknow
n-merchant,4,50000,19970321,06010,corestates-
bk,17,25000,19970405,06010,unknown-
merchant,2,1141,19970410,07338,a-d-c-the-map-
people,4,80000,19970411,06010,corestates-bk Note:
this is one line, but is shown as multiple lines due to space limitations in this document.

Generating Unique Merchant Names

In the development of the merchant clusters, it is desirable to use transaction data that includes the merchant name in each transaction. Like any textual information, same merchant name may have different spellings due to: misspell, different short-hand, regional spelling, branch information, etc. Accordingly, it is desirable to create a lookup table to equivalence these different spellings. This lookup table is also used during operation to obtain the UM given the merchant name or ID in an authorization request.

The data used to generate the merchant clusters is typically the authorization data for the transactions. If authorization data does not contain reliable merchant name information, it may be matched with corresponding posting data to obtain the merchant name for each transaction. Matching is based on a common key between an authorization and a posted transaction. One effective matching key is the combination of account number, authorization ID, and SIC code. Another effective matching key is the combination of account number, date, and SIC code.

Several aspects of the data make creation of a unique, one-to-one lookup table problematic. Generally, a valid text field has no leading blanks or non-alphanumeric characters, though it may vary considerably in length (6-16 characters). Some merchant ID numbers may include non-numeric (i.e. alpha) characters. The only obvious "junk" text fields are either blank or contain non-alphanumeric information.

A merchant ID may map to more than one UM string. In many cases, the different strings represented variations in spellings, abbreviations, and so on. Stemming and equivalencing algorithms are used here to match merchant names. Useful stemming and equivalencing algorithms are disclosed in the SelectProfile patent application, cross-referenced above. In other cases, these text fields differed only in store number; therefore, it is simple enough to truncate the merchant text at the last alpha character in the sequence. Finally, in many cases, the matching algorithm found several, entirely different test strings for each merchant ID. In this case, we decided to use the most frequently occurring text associated with a given merchant ID.

Various preferred data cleaning operations conducted on the lookup table include the following:
1. Simple stemming of merchant text
  all trailing numeric and whitespace is dropped
2. Deletion of invalid table entries
  remove all records with blank Merchant names
  remove records where Merchant ID contains non-alphanumeric characters.
  removed records where Merchant ID contains more than 10 blanks.
3. Selection of most frequent merchant name per unique merchant ID Most preferably, all three operations are performed, but use of just step 1 or steps 1 and 2 may be adequate for a particular embodiment. These steps may result in a greatly reduced lookup table, with only a single (and most commonly occurring) entry for each merchant ID. The UM is then inserted into the authorization data using the lookup table to create the final data set for building the CVs. In one embodiment, the name stemming and equivalencing methods disclosed in the SelectProfile application, incorporated by reference above, are used.

The resulting list of unique merchant names may still yield several millions UMs. In some embodiments it may be desirable to further limit this list according to frequency of merchant name, total merchant volume, average transaction size, or other metrics. Given the transaction data, and the UMs, the appropriate statistics may be generated (e.g. total number of transactions per UM, average transaction amount per UM, etc.) and the UMs sorted by the desired metric. So threshold amount may be used to select a subset of the UMs to further reduce the categorical content of the merchant names data.

Variations on the stemming and equivalencing may be used in order to better exploit the transaction data for purposes of fraud detection. For example, typically the store number of a merchant (e.g., "Macys #343") may be valuable information for the purposes of fraud detection and use of merchant names in risk tables. In such a case, the stemming algorithm should not to filter store numbers. It may also be desirable to encode the store number in the merchant stem in an intelligent way such that that information may be used when desired (e.g., in a risk table) and filtered out it when not needed (e.g., life style detection).

As explained above, the CV methodology is a preferred method of representing text and entities involved in credit card transactions (e.g. cardholders, merchants, etc.). However, the invention is not limited to the use of CV-based content mining methods. Other methods for content mining textual/high categorical information may also be used, such as the vector space models disclosed in Salton, G., et al., "A Vector Space Model For Automatic Indexing", Comm. Of the ACS, Vol. 18, No. 11, Nov. 1975, pp. 613-620); Wong, S. K. M., et al., "On Modeling of Information Retrieval Concepts in Vector Spaces", ACM Transactions on Database Systems, Vol. 12, No. 2, June 1987, pp. 299-321; Sutcliffe, R. F. E., "Distributed Representations in a Text Based Information Retrieval System: a New Way of Using the Vector Space Model", Proc. Of the ACM/SIGIR Conf., Oct. 13-16, 1991, Chicago, Ill., pp. 123-132; "Methods For Generating Or Revising Context Vectors For A Plurality Of Word Stems," U.S. Pat. No. 5,325,298; and "Method For Document Retrieval And For Word Sense Disambiguation Using Neural Networks," U.S. Pat. No. 5,317,507, all of which are incorporated by reference herein. Further, to the extent that natural language processing (NLP) techniques may be used to perform the data dimensionality reduction of credit/transactional data to a form using for input to a detection model, these methods and systems come within the scope of the invention. All of these approaches (both CV methods and non-CV methods) are collectively referenced as "content mining."

Further, in some cases, other rule-based approaches to dimensionality may suffice. Such methods include:
  Stemming: Eliminating low information content characters and words, such as blank spaces, punctuation, plurals, suffixes and conjugations (-ing, -tion, -ly, -es), common words (such as "of", "the", "and"), etc.;
  Word equivalencing: lookup tables of synonyms, character case, and common misspellings (e.g. Colour=color);
  Truncating: classifying a long text strings using only the first (e.g. 10-20) letters of each string; or
  Keyword matching: mapping long text strings to categories defined by the keywords contained within the text.

In limited circumstances where the vocabulary of the data set is small enough, such methods can reduce the dimensionality of text to a tractable number of categories. However, such methods are insufficient for reducing unconstrained, free-form text. For these cases of unconstrained free-form text, the more robust content mining methods are preferred.

Identifying UM Visited by Cardholders

In one embodiment, to identify 210 all UMs visited by a cardholder, we produce a 2-dimensional array of all pairs of unique merchants (an N×N array, where N is the number of UMs) and populate that array with the frequency of events of the same cardholder patronizing both merchants. This array serves as the analog of the co-occurrence matrix. One method of populating this array in a relatively efficient manner is as follows (this method may be readily coded, for example in SAS):
  Begin with a flat file of all transactions, as processed to include UMs
  Strip away all information from all transactions, with the exception of the unique merchant identifier (UM) and unique cardholder identifier.

Sort the file using the unique cardholder identifier as the first key and the unique merchant identifier as the second key. Remove duplicate records while sorting. (At this point the file begins with the first cardholder, identifying all merchants—in order—that the cardholder has transacted with, and then likewise for the second cardholder, and so on.)

Begin at the beginning of the file (with the first cardholder) and create a list of all merchants visited by that cardholder.

Using that list of merchants (that were visited by the first cardholder), create a list of all possible pairs of merchants.

Increment the corresponding element of the co-occurrence matrix for each pair of merchants.

Repeat this process for a list of all merchants visited by the second cardholder, then the third, etc.

When all cardholders have been thus processed, the co-occurrence matrix will be fully populated.

The co-occurrence matrix may now be further processed for corrections using the same algorithms as with text-analysis CV.

In addition, we may apply corrective techniques to reduce instances of co-occurrence that is driven primarily from geographical proximity dominating the data.

As mentioned, in one embodiment, the transactions are processed using time windows, so that transactions that occurring within a defined time window (e.g. 3 weeks), are deemed to co-occur, and transactions outside of the window are deemed as not co-occurring. This requires not stripping the transaction date from the data. Then, after sorting the file by cardholder, transactions are sorted by date, and the co-occurrence matrix is built using the co-occurrence window. The use of time dependent co-occurrence windows for building merchant vectors is further described in the Select Profile patent.

Merchant Vector Learning and Clustering

Following the generation of the co-occurrence matrix, the merchant vectors are modified based on the co-occurrence statistics. The various learning laws disclosed in the cross-referenced applications may be used, particularly those disclosed in the SelectProfile application, such as the UDL algorithm.

In addition, the transaction data will include geographical dependencies (merchants in same local geography), because cardholders by nature tend to visit merchants that are near each other (e.g., in the same shopping mall). This geographical relationship influences the merchant clusters; accordingly the clusters need to be modified to reduce the influence of the geographical relationships. For example, merchant clusters may be eliminated where more than a threshold amount of the merchants therein (e.g., 90%) are within the same zip code prefix (3 digits).

Note that, in a likewise manner, we can cluster cardholders based on the merchants they visit (simply repeat the algorithm described above, just reversing merchants and cardholders).

The Information Provided in Merchant Clusters

For the purposes of fraud control (among many other applications, such as marketing), it is important to know if a transaction is—or is not—normal for the cardholder. If it is not normal, then the likelihood that it is a fraudulent transaction perpetrated by someone other than the legitimate cardholder is higher. Current statistical fraud control systems are sensitive to instances when a cardholder apparently transacts at a SIC code that is not normal for that cardholder. However, they are unable to be sensitive to intricacies in merchant information that is not reflected by the SIC code (for instance, a cardholder who normally shops at Wal-Mart suddenly transacting at Macys). This is because current statistical fraud control systems relay on the SIC code alone to segment the merchant population, and SIC codes make no distinctions between various department stores in different market segments, for example. For instance, all department stores are given the same SIC codes—whether those are discount stores (like Wal-Mart) or high-end stores (like Macys).

In a likewise manner, merchants with different SIC codes may typically have an affinity to each other with regard to the customers they serve (for instance, discount department stores and discount supermarkets) that is not captured by their distinct SIC codes (supermarkets are in SIC 5411, while department stores are in SIC 5311). So, for instance, it is not unusual for a cardholder who normally shops at discount supermarkets to also shop at discount department stores, but perhaps more unusual for such a cardholder to shop at high-end department stores.

The information that would allow a distinction between merchants that share the same SIC code (and, conversely, allow the identification of affinity between merchants that cater to similar population across multiple SIC-codes) is contained within the merchant's name. As noted above, human fraud-control investigators know to incorporate this information in their assessments (a human investigator would have no problem reaching the conclusion that it is suspicious for a Wal-Mart and Food-for-Less {a discount supermarket} cardholder to suddenly have a buying spree at Macys and some high-end supermarket). Unfortunately, until now, the ability to make such distinctions has not been available to computerized systems because there has been no way to systematically and algorithmically represent this information in such systems.

The merchant-clustering methodology disclosed above, however, is specifically designed to group merchants based on how often they share customers. Consequently, when the high-dimensional-vector representation for two merchant are close together—possibly placing them within the same cluster—this is an indication that they share the same type of customers and are therefore related in some manner. It would thus be normal for a cardholder to patronize merchants in the same cluster(s) where (s)he has been transacting before, but less common to transact at merchants who belong to new clusters.

Using Merchant and Cardholder Clusters in Risk Detection

Figure 3:
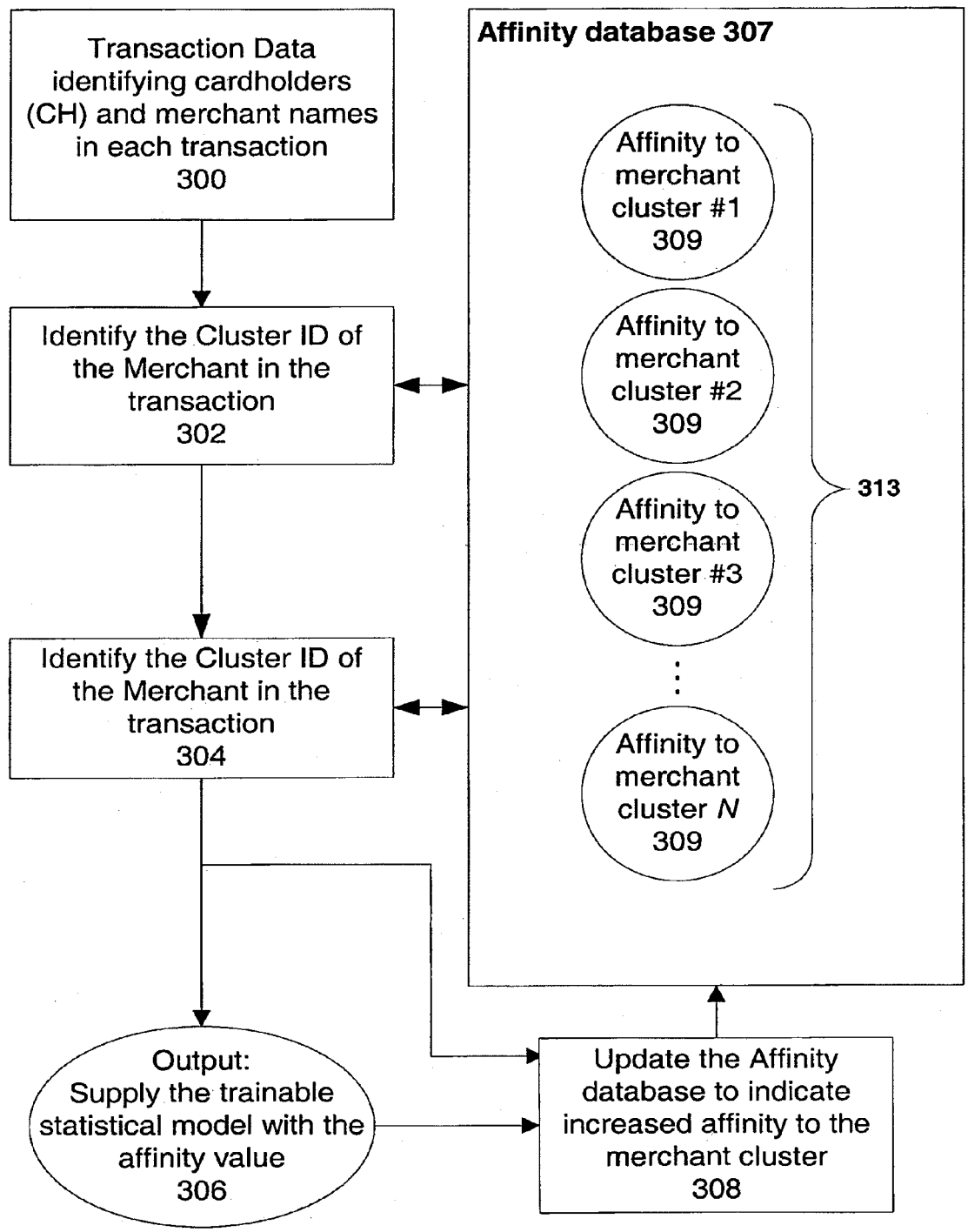
FIG. 3 is an illustration of one embodiment of using cardholder affinity to merchant clusters in an online transaction processing environment.

Once the information about merchant cluster has been captured, there are many ways we can make it available to a statistical fraud control system. FIG. 3 demonstrates how cardholder affinity to merchant clusters may be calculated and used in an online transaction processing environment, such as illustrated in FIG. 4.

Before the process is begun, there is provided in system 100 the merchant lookup table 311 or other mechanism matching every merchant name (and/or merchant ID) to a merchant cluster. There is also provided an Affinity Database 307, containing records which measure the affinity 309 of each cardholder to each merchant cluster. This database can, logically and physically, be part of the customer's behavioral profile 406, but it is shown here separately for clarity. The affinity 309 is a measure of the cardholder's affinity for a merchant cluster; it may be any useful measure, such as activity measures (e.g., transaction frequency in a merchant cluster, transaction dollar volume in cluster, average transaction amount, etc.). Alternatively, it may also be based on an affinity of a cardholder's cluster to the merchant cluster (where cardholder clusters are generated in a similar manner, and statistics for all cardholders in each cluster are calculated). Alternatively, the affinity may be an affinity vector 311, which is the combination of the affinity measure 309 for each merchant cluster.

Referring now to FIG. 3, the process begins with a transaction 300 that is to be scored. This transaction may be received from the merchant's point of sale device as the transaction is being processed, or it may be received in a batch, or by any other means. The transaction identifies a cardholder (e.g. cardholder account number) and a merchant (e.g., merchant ID or name) involved in the transaction.

The first step is to identify 302 the cluster ID of the merchant cluster to which the merchant involved in the transaction belongs. This identification will make use of the clustering that was developed in FIG. 2, for example by providing the merchant name or ID to the merchant lookup table 311, which returns the cluster ID of the merchant. If the merchant name or ID is not found in the lookup table 311, then the merchant cluster can be defaulted to be the merchant cluster containing the merchant SIC code (if there is more than one such merchant cluster, a heuristic is applied to select one of them, e.g. the cluster with the most merchants in it).

The next step is to query 304 the Affinity Database 307 as to the affinity of the cardholder to the now-identified merchant cluster. The Affinity Database 307 may provide the affinity measure 309 just for the particular merchant cluster, or for all merchant clusters, e.g. the affinity vector 313.

Once the affinity has been identified, it is supplied 306—together with other relevant data—to the Statistical Model 116 for preprocessing and other calculations as any other variable would be supplied.

In addition, the Affinity Database 307 is updated 308 as a consequence of each transaction to increase the relative affinity of the cardholder to the specific merchants' cluster associated with the transaction so as to reflect the affinity information content of the transaction for the benefit of future transaction scores.

This affinity computation is one example of how a high-categorical data field (merchant name) is converted to a low-categorical data field (merchant cluster ID) and then ultimately to numerical data (affinity value) as illustrated in FIG. 1.

Taking the affinity measure, the Statistical Model 116, in conjunction with any other desired information about the cardholder (e.g. from the profile 406), scores the transaction, and outputs this score. This score is preferably a measure of the relative risk of the transaction, for example, the probability that the transaction is fraudulent.

As is apparent to those of skill in the art, prior to use in operation, the Statistical Model 116 is developed (e.g. trained) using the same types of affinity inputs as will be used in operation. In building the model, it is desirable to use at least 12 months of transaction data. In training the model, it is desirable to use a 1-10% sample of non-fraud accounts, and 100% of fraud accounts; the exact percentages of nonfraud accounts can vary with the number of accounts in the portfolio, the estimated fraud rate, the type of model, and other implementation details. The Statistical Model 116 is preferably a neural network model, which is trained using backpropogation. In some embodiments, a cost function for weight decay (e.g. a Weigand cost function) is used to decay the network weights during training; one preferred cost function using an interlayer gain multiplier for the decay rate is disclosed in the Falcon patent. Other techniques may be used to create the Statistical Model 116, such as multivariate regression.

Additional Extensions and Alternate Embodiments

A typical trainable statistical fraud control system, such as a neural network system, accepts data in various pre-processed forms. The more the pre-processed data capture information that is relevant to the overall objective (identifying fraudulent transactions), the more the statistical method is able to take advantage of that information to achieve higher performance levels. The merchant clusters capture a high degree of relevant fraud-control information (as explained above) and are therefore very useful to a trainable statistical method. However, merely the cluster information is not the only information that may be useful for detecting or predicting fraudulent behavior. Additional light processing of the merchant clusters and cardholder clusters may provide further variables and information useful the Statistical Model 116. The followings are examples of such additional steps:

1. Create a small number of merchant clusters. For each cardholder, create a vector of their affinity to each cluster. The affinity measure may be how often the consumer transacts at a merchant member of each cluster, dollar volume, or other activity measures. When scoring a transaction, provide the trainable system with a variable representative of the affinity of the cardholder in the transaction to the merchant cluster in the transaction.

2. Same as #1 above, but instead of creating an affinity vector for each cardholder, do it for each cluster of cardholders; cardholder clusters are constructed in the manner described above. This approach requires less computer resources than #1, and can take advantage of more data in each evaluation; but it also provides less resolution. Each cardholder is labeled with the cardholder cluster, and the affinity vector for that cardholder cluster is used. (Thus, there are at least four variants of the affinity measure: cardholder affinity to merchant cluster; cardholder cluster affinity to merchant cluster; cardholder affinity to each merchant cluster; cardholder cluster affinity to each merchant cluster. The former are single affinity measure, the latter are vectors.)

3. Calculate the risk of each merchant cluster. The risk of a merchant cluster is the percentage of transactions taking place at merchant members of the cluster that eventually are determined to have been fraudulent. When scoring a transaction, provide the trainable system with a variable representative of the risk of the merchant cluster in the transaction.

4. Calculate the risk of each possible pair of cardholder and merchant clusters. The risk of a pair of cardholder and merchant clusters is the percentage of transactions taking place at merchant members of the merchant cluster by cardholder members of the cardholder cluster that eventually are determined to have been fraudulent. When scoring a transaction, provide the trainable system with a variable representative of the risk of the cardholder and merchant clusters in the transaction.

5. For each merchant cluster, calculate parameters representative of a merchant cluster (such as average transaction amount). When scoring a transaction, provide the trainable system with variables representative of those parameters for the merchant cluster in the transaction.

6. Same as #5, but with cardholder clusters instead of merchant clusters.

7. Use the merchant cluster as a substitute (or an addition) to the SIC code in all instances and manners the SIC code is used in the trainable model.

8. The underlying merchant clustering processes disclosed in the SelectProfile patent generate merchant clusters for predicting spending patterns of cardholders, based on historical spending patterns. These predicted merchant clusters may be used as input variables in the Statistical Model 116, so as to compare the predicted spending behavior of a cardholder with the actual transactions, essentially providing a measure of activity change. For example, a sudden change in spending behavior might legitimately be due to a cardholder moving, buying a house, etc., rather than due to fraud.

The merchant clusters provide more granularity than clusters based on SICS alone, simply because there are more merchant names than SICS. Accordingly, in one embodiment, a limited number of base merchant clusters (e.g., 50-80 base clusters) are compared with SIC base clusters, and then merged to form 10-15 super clusters. Variables are then derived from these clusters and compared in terms of predictive power to existing factor grouping parameters. Variables that provide additional predictive power are utilized in the Statistical Model 116.

9. In this the above described embodiment, novel or low volume merchants name are defaulted to clusters containing their corresponding SIC-pseudo-merchant. An alternative method of handling novel text is to map the text to the content vector associated with the component trigrams of the merchant name. A trigram is a substring of 3 letter found in the string of a merchant name. To illustrate, suppose a new merchant ("BOB'S TOY STORE") appears in the transaction stream. The CV stemming routines routinely omit the trailing "S", since possessives and plural cases of stems do not generally add useful information. After stemming, the new text stream would be decomposed into its component "trigrams" as follows:

BOB, TOY, STO, TOR, ORE (Note, in this embodiment, trigrams start at or within a word, and do not extend across words; other trigram rules are possible as well.)

The content vector assigned to this merchant would be a vector sum of the content vector associated with each of its component trigrams, "BOB", "TOY", "STO", "TOR", "ORE". Thus, this merchant would share at least one trigram with "Toys R Us". The content vector of this merchant name can then be compared with the content vectors of the existing list of UMs, and the UM with closest matching content vector can be assigned to the merchant name.

10. The above described embodiment focused specifically on identifying and clustering merchant names, and using the merchant clusters as an input to the Statistical Model 116. However, the techniques described above are more generally applicable to any text field that appears in data related to the transaction. Thus, in the transaction feed, separately from the merchant name, there are merchant comments (e.g. call notes) which may provide additional descriptive information about a transaction. Context vectors generated from historical call notes may be clustered to create a number of call note clusters, which are then used in training the Statistical Model. When a new transaction is received, the context vector of its call notes it mapped to a call note cluster, which is then input into the Statistical Model. Similarly, text data associated with the cardholder specific or demographic data can be clustered, as well as customer service call notes. Further web page interactions by customers, which are rich sources of contextual data, may be mapped into clusters. Finally, any textual data regarding the merchant information feed may also be clustered.

11. As noted above, both merchant and cardholder clusters may be created. However, other uses of merchant context vectors may be employed. For example, merchant names may be cross-clustered with cardholder lifestyle data, where the latter is based on an analysis of cardholder spending patterns. Also, risk factors based on cluster to cluster (cardholder to merchant) relationships can be created, and used as inputs to the Statistical Model 116. Finally, merchant proximity measures (how close one merchant is to another) can be determined based on the merchant cluster centroids, merchant context vectors, cardholder clusters of visitors to the clusters, or identifiable words in a merchant name.

12. Various other methods of clustering merchants may be used. Merchants may be clustered by sub-dividing SIC codes, for example by the cardholders who visit merchants in each SIC code. Merchants may be clustered based on attributes of the transactions, such as average transaction value, or the distribution of transactional profiles.

Using Merchant and Cardholder Clusters in Fraud Control Workflow

While the principal objective of a trainable statistical fraud control system is the automation of the identification of transactions with a high likelihood of being fraudulent, there are many advantages and reason for some degree of human intervention. There are two levels of human intervention: setting rules and investigating individual cases. Fraud control managers often set rules for the computerized fraud control system to identify frauds that, for whatever reason, the trainable statistical method may not identify as well (for instance when a new fraud pattern emerges). Fraud analysts receive leads from the overall fraud control system (either through the trainable statistical system or the set rules) and investigate them individually to determine what fraud control action may be appropriate. (A typical fraud control action would be to call a cardholder at home and request verification of recent transactions.) Both of these levels of human intervention can take advantage of information that can be gleaned from the merchant and cardholder clusters.

Before clusters are used by the human component of a fraud control system, it is advantageous to provide each cluster with a name that provides meaningful information to the manager or investigator. If the number of clusters selected is relatively small, it may be best to have a human expert examine some of the constituent merchants of each cluster and designate a descriptive name (such as "high-end shops", "do-it-yourself vendors", or "business travel"). It is also relatively easy to define an automated methodology of naming clusters in a manner that will be human-intelligible. One way, for instance, is to select the most commonly transacting merchant or two (perhaps with the distinction that they must be from different SIC codes) in each cluster as the name of the cluster. Merchant clusters would then have names like "Wal-Mart/Food-for-Less" or "Hilton/Hertz". Alternatively, the descriptive names of the two or three most frequently occurring SIC codes in a merchant cluster may be used as the merchant cluster name. For example, if the two most frequently occurring SIC codes were 5399-9906 and 5734-9901, then the cluster name would be "PERSONAL COMPUTERS/WAREHOUSE CLUB STORES" (the names of these two SIC groups, respectively). Note again that this cluster does not exist in the SIC hierarchy per se, and thus provides more fine grained information about the nature of the underlying purchasing behavior of the cardholders. A human expert or an automated algorithm can also name cardholder clusters based on the merchants they patronize (getting names such as "business traveler" or "starving student")

The merchant clusters may then be used in establishing workflow policies for tagging accounts or transactions for further human analysis. For example:

1. At the rule-setting level, fraud managers may designate rules based on named and generic merchant and cardholder clusters.

For instance: "flag transactions when a 'starving student' shops at a 'high-end store'"

For instance: "flag transactions when the likelihood that a member of the respective cardholder cluster transacting at a member of the respective merchant cluster is less than 1%"

For instance, in response to an attack by a counterfeiting ring or a new fraud pattern targeting casinos in Brazil: "flag transactions taking place in Brazil at the 'casino' merchant cluster".

Fraud managers monitoring activities may be better able to identify the activities of fraud rings and recognize new attacks by observing that specific merchant clusters are experiencing a jump in fraud levels. At such time they would be able to immediately institute rules that target the affected merchant clusters.

2. At the individual investigation level, named and generic clusters information help a case management system provide human-intelligible information to the fraud analyst as to why the lead presented to the analyst represents a suspicious transaction. This helps the analyst to have a better and more efficient investigative process.

For instance, a reason can be provided to the analyst like "This transaction is suspicious because it involves a 'starving student' shopping at a 'high-end store'".

For instance, a reason can be provided to the analyst like "This transaction is suspicious because cardholders like the one in this transaction shop at stores like the one in this transaction less than 1% of the time".

For instance, a reason can be provided to the analyst saying something like "This transaction is suspicious because it involves a 'starving student' spending over $500 at a jewelry store."

For instance, a reason can be provided to the analyst saying something like "This transaction is suspicious because it involves a cardholder who normally transacts at 'discount stores' now transacting at a 'high-end store'"

As will be understood by those familiar with the art, the invention may be embodied in other specific forms without departing from the spirit or essential characteristics thereof. For example, the particular division of functionality between the various modules or components may differ from that described herein, given the variety of software development environments and hardware platforms that may be used to practice the invention. Thus, the particular functions of the transaction processing component, the model development component, and so forth may be provided in more or fewer modules. Also, the Statistical Model may be implemented in a variety of modes, including a neural network, a multivariate regression model, or any other model which classifies inputs based on statistical analysis of historical exemplars. Finally the particular capitalization or naming of the modules, protocols, features, attributes, data structures, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

The invention claimed is:

1. A system for detecting risk in a transaction, the system comprising:
a database of unique merchant names, each merchant name associated with a merchant cluster, each merchant name being textual data or other high categorical data;
at least one computing system implementing a transaction processing component that receives a transaction of a plurality of transactions between a consumer and a merchant, the transaction process component deriving transaction data from the transaction, the transaction processing component determining from the database a unique merchant identity for the merchant; and
at least one computing system implementing a statistical model that receives the derived transaction data and the unique entity identity to output a score indicative of a level of risk in the transaction;
wherein the statistical model uses clustered context vectors generated by:
selecting a plurality of high categorical information elements from the plurality of transactions,
linking each high categorical information element with a context vector in a vector space such that high categorical information elements that co-occur in the plurality of transactions have context vectors that are similarly oriented in the vector space, the co-occurrence representing that context vectors corresponding to the co-occurring high categorical information elements are less than a predetermined distance apart in the vector space for more than a predetermined number of transactions, and
clustering the context vectors of the high categorical information elements into a number of clusters that is less than number of high categorical information elements, each cluster being a low categorical information cluster.

2. A computer-implemented method of determining a level of risk in a transaction, the method comprising:
receiving, by at least one data processor, a transaction of a plurality of transactions between a first entity and a second entity, the first entity comprising a consumer associated with the transaction and the second entity comprising a merchant associated with the transaction;
deriving, by at least one data processor and by using a selecting process, high categorical information elements from the transaction, the high categorical information elements being text data;
determining, by at least one data processor, a low categorical information cluster that is closest in vector space to a context vector that is derived from context vectors of the high categorical information elements, the determining comprising:
linking, by at least one data processor, each high categorical information element with a context vector in a vector space such that high categorical information elements that co-occur in the plurality of transactions have context vectors that are similarly oriented in the vector space, the co-occurrence representing that context vectors corresponding to the co-occurring high categorical information elements are less than a predetermined distance apart in the vector space for more than a predetermined number of transactions, and
clustering, by at least one data processor, the context vectors of the high categorical information elements into a number of clusters that is less than number of high categorical information elements, each cluster being a low categorical information cluster; and
applying, by at least one data processor, the low categorical information cluster and data derived from the transaction to a predictive model to output the level of risk in the transaction to detect if the transaction is fraudulent.

3. The method of claim 2, wherein:
the high categorical information elements comprise entity notes associated with the transaction.

4. A computer implemented method for determining a level of risk of a transaction between a consumer and an entity, the method comprising:
- storing, by at least one data processor, a plurality of entity clusters, the plurality of entity clusters determined from statistical co-occurrences of the entity identified in a plurality of transactions, the statistical co-occurrences identified using entity identifiers or other high categorical data, the entity comprising a merchant associated with the transaction, the plurality of entity clusters being generated by:
  - selecting a plurality of high categorical information elements from the plurality of transactions from the plurality of transactions,
  - linking each high categorical information element with a context vector in a vector space such that high categorical information elements that co-occur in the plurality of transactions have context vectors that are similarly oriented in the vector space, the co-occurrence representing that context vectors corresponding to the co-occurring high categorical information elements are less than a predetermined distance apart in the vector space for more than a predetermined number of transactions, and
  - clustering the context vectors of the high categorical information elements into a number of entity clusters that is less than number of high categorical information elements, each entity cluster being a low categorical information cluster;
- receiving, by at least one data processor, data from said transaction between said consumer and said entity;
- determining, by at least one data processor, an entity cluster of the plurality of entity clusters linked to the entity of the transaction based on at least one or the entity identifier and the other high categorical data; and
- applying, by at least one data processor, the determined entity cluster in conjunction with data derived from the transaction to a predictive model, the predictive model outputting a level of risk of the transaction to detect if the transaction is fraudulent.

5. The method of claim 4, further comprising the step of:
estimating, by at least one data processor, a likelihood that the transaction is fraudulent.

6. The method of claim 4, further comprising the step of:
determining, by at least one data processor and in response to the level of risk, whether to approve the transaction, decline the transaction, or obtain additional information regarding the transaction or the consumer.

7. The method of claim 4, wherein the step of determining the entity cluster further comprises the steps of:
- storing, by at least one data processor, a lookup table that links each entity cluster with at least one entity identity, each entity identity of the at least one entity identity being unique; and
- applying, by at least one data processor, the entity identifier to the lookup table to determine the linked in entity cluster.

8. The method of claim 7, wherein each unique entity identity is derived from a plurality of raw entity identities in transaction data by performing a stemming operation and an equivalencing operation on the raw entity identities,
- wherein the stemming operation comprises eliminating low information characters and words from the raw entity identities, the low information characters and words including blank spaces, punctuation, plurals, suffixes, conjugations and articles, and
- wherein the equivalencing operation comprises considering synonyms, different spellings and different character cases for the same words to correspond to a same unique entity identity.

9. The method of claim 4, further comprising the steps of:
- storing, by at least one data processor, for each entity cluster a risk factor indicative of likelihood that transactions with entities within the entity cluster are fraudulent; and
- applying, by at least one data processor, the risk factor of the entity cluster to the predictive model.

10. The method of claim 9, wherein the risk factor is an estimate of a percentage of transactions at entities within the entity cluster that are fraudulent.

11. The method of claim 4, further comprising the steps of:
- storing, by at least one data processor, a plurality of consumer clusters;
- storing, by at least one data processor and for each combination of a consumer cluster and an entity cluster, a risk factor indicative of a likelihood that transactions by consumers in the consumer cluster with entities within the entity cluster are fraudulent;
- determining, by at least one data processor, a current consumer cluster associated with the consumer; and
- applying, by at least one data processor, the risk factor of the combination of the current consumer cluster and the entity cluster to the predictive model.

12. The method of claim 11, wherein the risk factor is an estimate of a percentage of transactions at entities within the entity cluster by consumers in the consumer cluster that are fraudulent.

13. The method of claim 4, further comprising the steps of:
- storing, by at least one data processor, for each entity cluster at least one summarized transaction statistic, descriptive of transactions occurring at entities in the entity cluster; and
- applying, by at least one data processor, the at least one summarized transaction statistic of the entity cluster to the predictive model.

14. The method of claim 13, wherein the at least one summarized transaction statistic are selected from a group consisting of:
- average transaction amount; and
- average transaction volume.

15. The method of claim 4, further comprising the steps of:
- storing, by at least one data processor and for each of a plurality of consumer clusters, at least one summarized transaction statistic, descriptive of transactions by consumers in the consumer cluster; and
- applying, by at least one data processor, the at least one summarized transaction statistic of the consumer cluster to the predictive model.

16. A computer implemented method for determining a level of risk of a transaction between a consumer and an entity, the method comprising:
- storing, by at least one data processor, a plurality of entity clusters, the plurality of entity clusters determined from statistical co-occurrences of the entity identified in a plurality of transactions, the statistical co-occurrences identified using entity identifiers or other high categorical data, the entity comprising a merchant associated with the transaction, the plurality of entity clusters being generated by:
  - selecting a plurality of high categorical information elements,
  - linking each high categorical information element with a context vector in a vector space such that high categorical information elements that co-occur in the plurality of transactions have context vectors that are similarly oriented in the vector space, the co-occurrence representing that context vectors corresponding to the co-occurring high categorical information elements are less than a predetermined distance apart in the vector space for more than a predetermined number of transactions, and clustering the context vectors of the high categorical information elements into a number of entity clusters that is less than number of high categorical information elements, each entity cluster being a low categorical information cluster;

receiving, by at least one data processor, data from said transaction between said consumer and said entity;

determining, by at least one data processor, an entity cluster of the plurality of entity clusters associated with the entity of the transaction based on at least one or the entity identifier and the other high categorical data;

determining, by at least one data processor, an affinity measure indicative of an affinity of a consumer to the entity cluster; and applying, by at least one data processor, the affinity measure in conjunction with data derived from the transaction to a predictive model, the predictive model outputting the level of risk of the transaction to characterize whether the transaction is fraudulent, wherein the affinity measure comprises at least one of transaction frequency, total currency volume, and average transaction amount, which are associated with transactions between the consumer and one or more entities that are included in the entity cluster.

17. The method of claim 16, wherein the step of determining the affinity measure of an affinity of the consumer to the entity cluster further comprises the step of:

determining, by at least one data processor, an affinity vector that represents the measured affinity of the consumer to each entity cluster of a plurality of entity clusters.

18. The method of claim 16, wherein the step of determining the affinity measure of an affinity of the consumer to the entity cluster further comprises the steps of:

determining, by at least one data processor, a consumer cluster associated with the consumer; and determining, by at least one data processor, an affinity measure of the affinity of the consumer cluster to the entity cluster.

19. The method of claim 16, wherein the step of determining the affinity measure of an affinity of the consumer to the entity cluster further comprises the steps of:

determining, by at least one data processor, a consumer cluster associated with the consumer; and determining, by at least one data processor, an affinity vector that characterizes at least one affinity measures for the consumer cluster in relation to each of a plurality of entity clusters, including the entity cluster of the entity of the transaction.

20. A method of determining the level of risk in a transaction by a consumer, the method comprising:

storing, by at least one data processor, a plurality of entity clusters, the plurality of entity clusters determined from statistical co-occurrences of the entity identities in a plurality of transactions, the entity identities being entity identifiers or other high categorical data, the plurality of entity clusters being generated by:

selecting a plurality of high categorical information elements from the plurality of transactions, linking each high categorical information element with a context vector in a vector space such that high categorical information elements that co-occur in the plurality of transactions have context vectors that are similarly oriented in the vector space, the co-occurrence representing that context vectors corresponding to the co-occurring high categorical information elements are less than a predetermined distance apart in the vector space for more than a predetermined number of transactions, and clustering the context vectors of the high categorical information elements into a number of entity clusters that is less than number of high categorical information elements, each entity cluster being a low categorical information cluster;

receiving, by at least one data processor, data of a current transaction between a consumer and an entity, the entity comprising a merchant associated with the current transaction;

determining, by at least one data processor, a predicted entity cluster in which the consumer is predicted to perform a future transaction based on transactions of the consumer prior to the current transaction;

determining, by at least one data processor, an actual entity cluster associated with the entity of the transaction based on the entity identity, wherein said entity identity is an entity identifier or other high categorical data;

determining, by at least one data processor, a measure of difference between the predicted entity cluster and the actual entity cluster; and applying, by at least one data processor, the determined measure of difference in conjunction with data derived from the transaction to a predictive model, and outputting the level of risk of the transaction to detect if the transaction is fraudulent.

21. A method for implementation by one or more data processors comprising:

receiving, by at least one data processor, data characterizing a transaction of transactions between a consumer and merchant;

linking, by at least one data processor, the merchant with one of a plurality of pre-defined merchant clusters, the merchant clusters defined by a frequency at which merchants historically shared customers, the merchant clusters being generated by:

selecting a plurality of high categorical information elements from the transactions, linking each high categorical information element with a context vector in a vector space such that high categorical information elements that co-occur in the transactions have context vectors that are similarly oriented in the vector space, the co-occurrence representing that context vectors corresponding to the co-occurring high categorical information elements are less than a predetermined distance apart in the vector space for more than a predetermined number of transactions, and clustering the context vectors of the high categorical information elements into a number of merchant clusters that is less than number of high categorical information elements, each merchant cluster being a low categorical information cluster;

determining, by at least one data processor, an affinity of the customer to an associated merchant cluster;

generating, by at least one data processor, a risk score using at least one predictive model and at least the determined affinity; and initiating, by at least one data processor, provision of data characterizing the generated score.

22. A method as in claim 21, wherein the linking comprises: polling a merchant lookup table to match an identification for the merchant with the associated merchant cluster; and wherein the determining comprises: polling an affinity database to obtain the determined affinity.

23. A method as in claim 21, wherein the at least one predictive model further utilizes a profile for the consumer to generate the risk score.

24. A method as in claim 21, wherein the affinity is based on historical transaction data for the customer.

25. A method as in claim 24, wherein the historical transaction data used for the determined affinity is selected from a group comprising: transaction frequency in the associated merchant cluster, transaction money volume in the associated merchant cluster, average transaction amount in the associated merchant cluster.

26. A method as in claim 21, wherein the consumer is associated with a consumer cluster, and wherein the determined affinity is based on an affinity statistic derived from the consumer cluster as a whole relative to the associated merchant cluster.

27. A method as in claim 21, wherein the determined affinity is based on an affinity vector which is a combination of an affinity measure for the consumer in relation to each of the plurality of pre-defined merchant clusters.

28. A method as in claim 21, wherein the at least one predictive model further utilizes a variable representing historical transactions that were deemed to have been fraudulent among the merchants in the associated merchant cluster.

* * * * *